United States Patent [19]
Usami et al.

[11] Patent Number: 5,504,592
[45] Date of Patent: Apr. 2, 1996

[54] COLOR EXPRESSING METHOD, COLOR IMAGE READING APPARATUS AND COLOR IMAGE PROCESSING APPARATUS

[75] Inventors: Akihiro Usami; Takashi Kawai, both of Yokohama, Japan

[73] Assignee: Canon Kabushiki Kaisha, Tokyo, Japan

[21] Appl. No.: 391,557

[22] Filed: Feb. 21, 1995

Related U.S. Application Data

[62] Division of Ser. No. 909,995, Jul. 7, 1992, Pat. No. 5,422,739.

[30] Foreign Application Priority Data

Jul. 8, 1991 [JP] Japan .................................. 3-167037
Jan. 6, 1992 [JP] Japan .................................. 4-111

[51] Int. Cl.$^6$ .............................. H04N 1/56; H04N 1/60
[52] U.S. Cl. ...................... 358/5.18; 358/519; 382/167
[58] Field of Search .................................. 358/518, 520, 358/523, 519; 382/167

[56] References Cited

U.S. PATENT DOCUMENTS

| | | |
|---|---|---|
| 4,409,614 | 10/1983 | Eichler et al. . |
| 4,965,663 | 10/1990 | Sasaki . |
| 5,126,838 | 6/1992 | Ohsawa et al. . |
| 5,315,415 | 5/1994 | Kawai et al. ............ 358/515 |
| 5,339,365 | 8/1994 | Kawai et al. . |

FOREIGN PATENT DOCUMENTS

| | | | |
|---|---|---|---|
| 203448 | 12/1986 | European Pat. Off. ......... H04N 1/46 |
| 80-00753 | 4/1980 | WIPO ............................ G03B 27/73 |

OTHER PUBLICATIONS

"Television Engineering Handbook", K. Blair Benson, pp. 2.3–2.26, McGraw–Hill, 1986.

"The Color Space For Color Communication Among Different Kinds of Apparatuses", Image Technology Center, Canon, Inc., Apr. 10, 1992.

*Primary Examiner*—Scott A. Rogers
*Attorney, Agent, or Firm*—Fitzpatrick, Cella, Harper & Scinto

[57] ABSTRACT

A color image reading system in which an input color image signal is converted into color data signals. The color data signals are indicative of a combination of data of reference stimuli represented by verticles of a triangle of which one side circumscribe a pure purple locus, and of which the remaining two sides circumscribers two points of a spectral locus of a color degree diagram, the two points representing substantially middle colors between a color represented by one vertex of the triangle at which the remaining two sides intersect and each of two colors represented by the remaining two sides of the triangle, respectively. The input color image signal is reproduced on a color image output device in response to the provision of the color data signals.

14 Claims, 17 Drawing Sheets

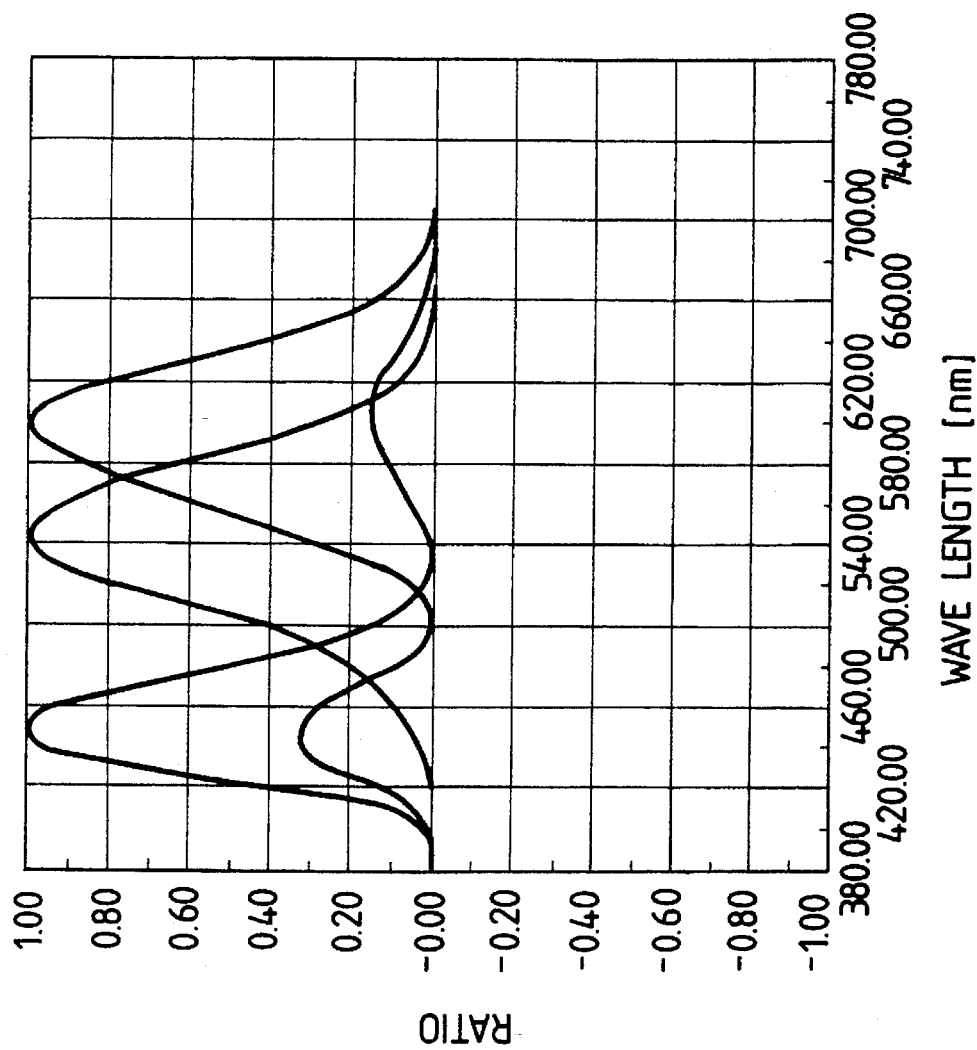

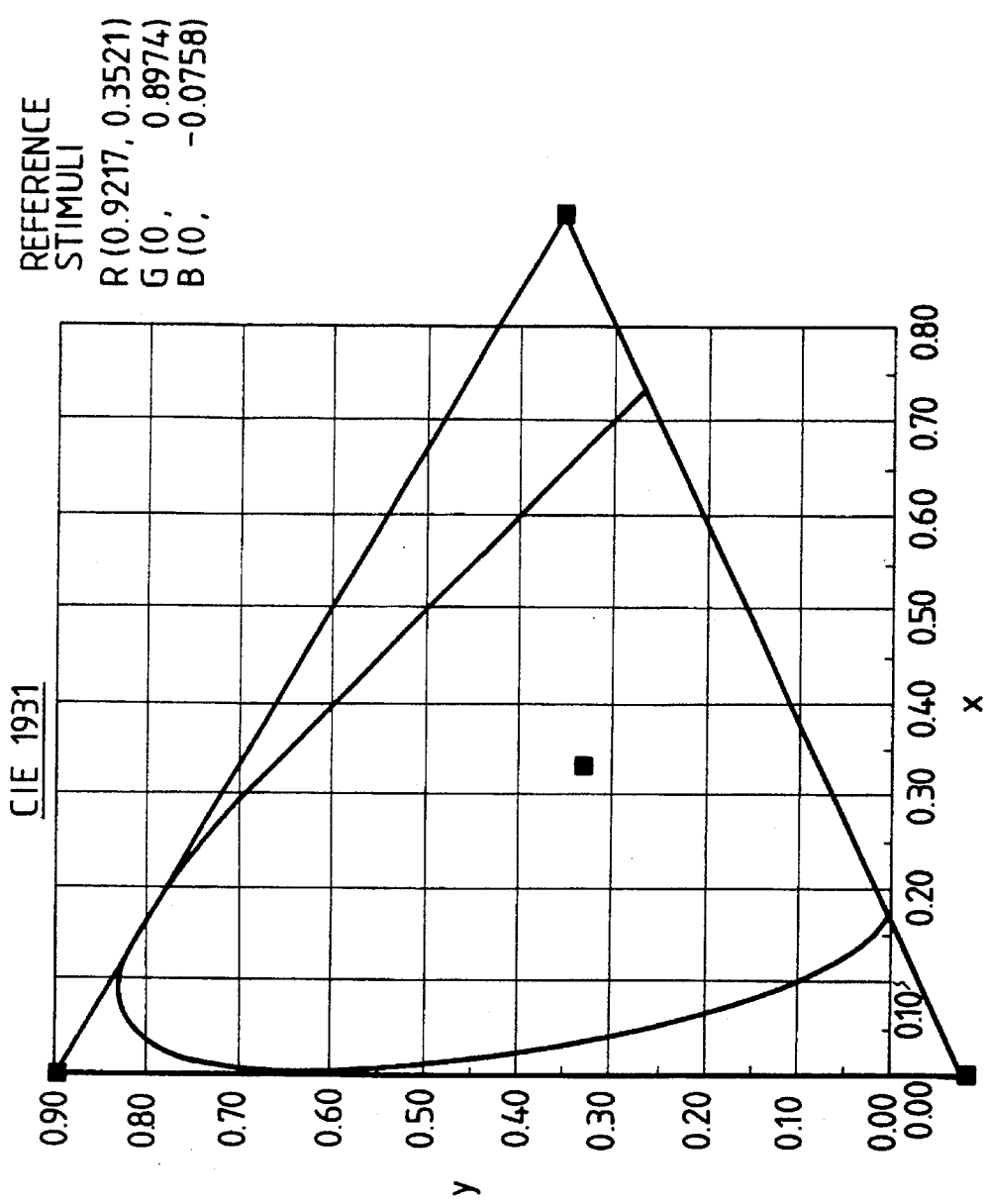

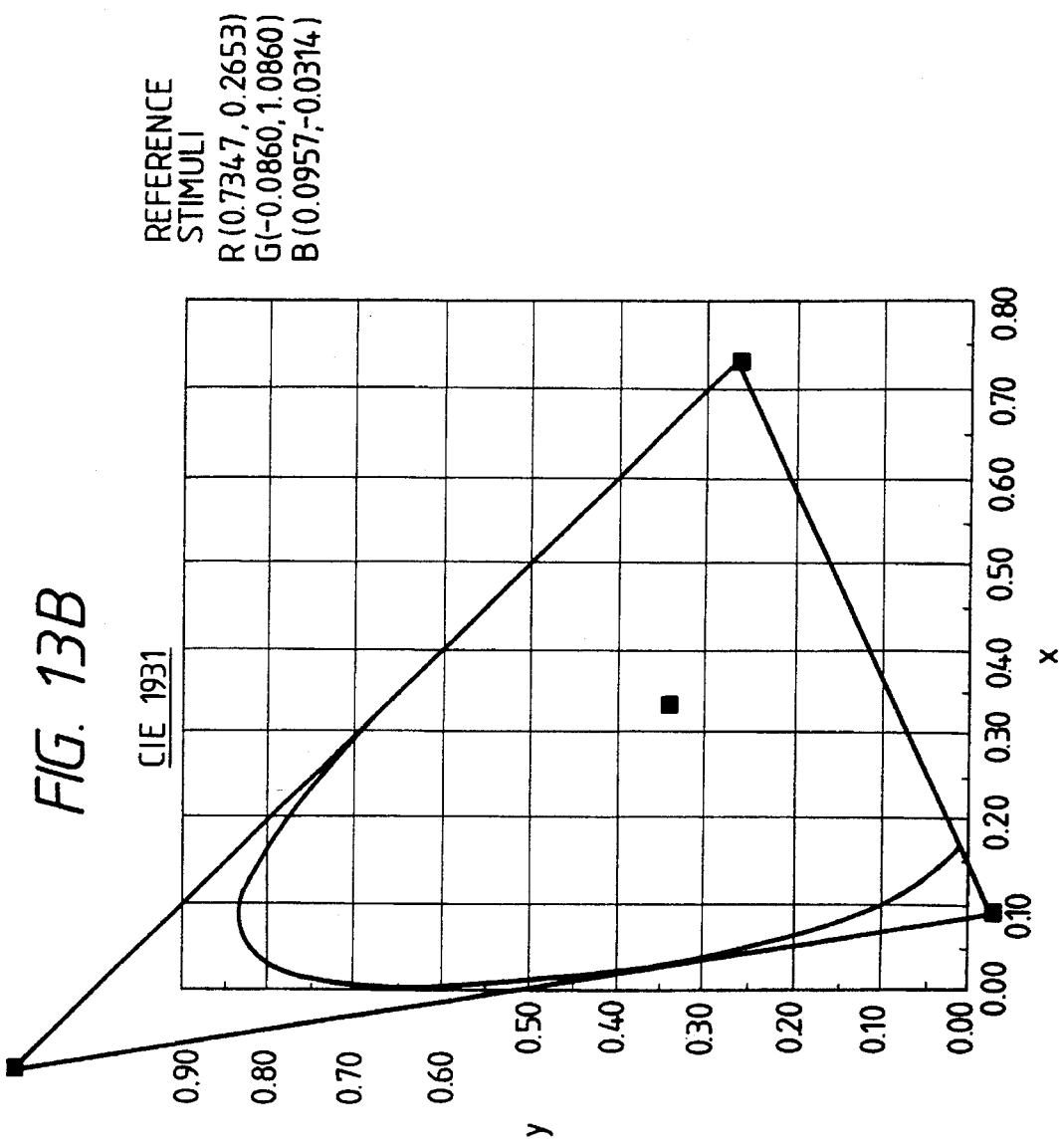

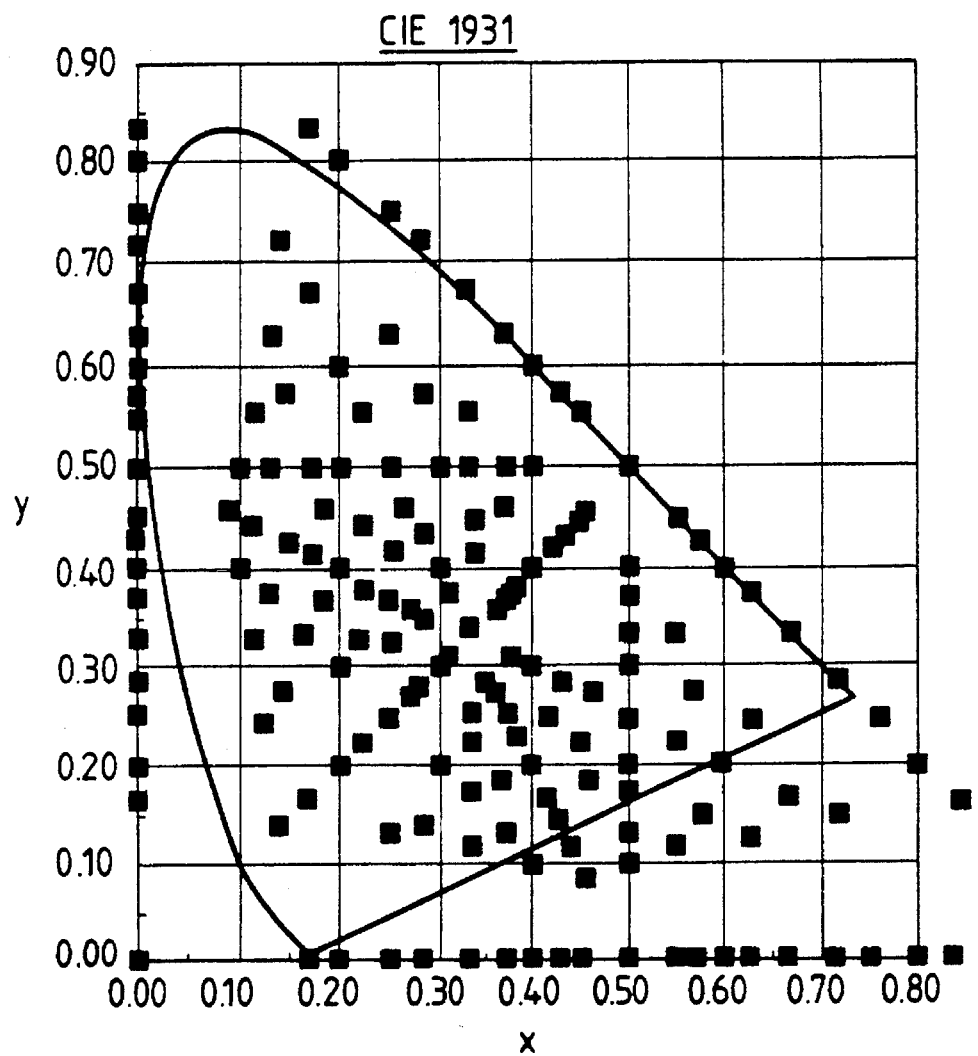

COLOR EXPRESSING METHOD, COLOR IMAGE READING APPARATUS AND COLOR IMAGE PROCESSING APPARATUS

This application is a division of application Ser. No. 07/909,995 filed Jul. 7, 1992, now U.S. Pat. No. 5,422,739.

BACKGROUND OF THE INVENTION

1. Field of the Invention

The present invention relates to a color expressing method, a color image reading apparatus, and a color image processing apparatus.

2. Related Background Art

For example, a conventional color expressing method in a color image reading apparatus adopts a color system of R, G, and B signals determined by, e.g., an NTSC (Nationalscheme Television Sub-Committee) scheme and represented by R, G, and B in FIG. 6 as spectral sensitivity of a tricolor separation system. The color system is determined in accordance with the color emission characteristics of R, G, and B phosphor materials of a cathode-ray tube as coloring materials used in a television receiver. A method using the spectral sensitivity in the XYZ colorimetric system of the CIE (Commission Internationale del'Eclairage) or a tricolor separation system having a narrow-band (narrow band width) spectral sensitivity for measuring the Y (yellow), M (magenta), and C (cyan) densities of inks or colorants used in an original (transmission or reflection) is known.

In the prior art described above, since marks representing R, G, and B chromaticity values or color degrees are plotted within a spectral locus, as shown in FIG. 6, the spectral sensitivity characteristics of the tricolor separation system used in a color image reading apparatus for generating R, G, and B signals which satisfy these chromaticity values must have a theoretically negative region, as shown in FIG. 7. However, the spectral sensitivity characteristics having a negative region cannot be realized in practice. The spectral sensitivity characteristics are therefore approximated by spectral correction (i.e., the negative region is eliminated or correction is performed as indicated by broken lines), as shown in FIG. 8, or corrected in accordance with linear conversion. However, with this method, the color characteristics of a target original or an object are read with a large amount of errors. Even if the color characteristics are accurately read, colors plotted outside the triangle defined by chromaticity values of color components emitted from the above-described phosphor materials such as colors represented by marks X in FIG. 9 have negative signal values. This phenomenon causes difficulty in processing signals. If each negative signal is set to "0", the corresponding color cannot be expressed, resulting in an incorrect reproduction of the color.

In use of a color expressing method of the XYZ colorimetric system of the CIE, signal values read for expressing colors along the x- and y-axes in the color degree diagram or chromaticity diagram in FIG. 6 are not negative. The spectral sensitivities for realizing the XYZ colorimetric system for realizing the above color expressing method are as shown in FIG. 10 (the signal values are normalized with maximum sensitivity values). As is apparent from FIG. 10, since the full-width at half maximum of the Y spectral sensitivity for forming a Y signal is wide, filters having different spectral transmittances must be combined to satisfy this spectral sensitivity. Digital values of the X, Y, and Z signals cover a wide region on the color degree diagram, and nonexisting colors are also assigned with signal values. The number of effective data becomes only about 65% of all data to be quantized (FIG. 14). FIG. 14 shows chromaticity points obtained when X, Y, and Z signals are quantized with six levels. It is apparent that chromaticity points outside the spectral locus are present, thus resulting in inefficient signal value utilization.

In a chromaticity meter using a narrow-band spectral filter used in printing equipment, the color separation characteristics of an object such as a color picture are poor except when the spectral characteristics of inks and the like used in an original are already known.

For example, in a system such as a digital color copying machine integrally including a color image reading apparatus, a color image processing apparatus, and a color image output apparatus, a unique color data expressing method is used for operations from color image inputs to color image outputs in accordance with the spectral sensitivity characteristics of a tricolor separation system and the spectral characteristics of inks and colorants.

In a color image reading apparatus such as a color image reader, read signals are obtained using a color data expressing method depending on the spectral sensitivity characteristics of a tricolor separation system used in this apparatus. Similarly, in a color image output apparatus such as a color printer of an ink-jet or thermal transfer system, colors expressed by input signals vary depending on the types of color printers. That is, a color data expressing method unique to each printer is employed.

As described above, in a color monitor such as a color television receiver, an RGB color data expressing method complying with the NTSC standards shown in FIG. 14, as described above, is employed in Japan. This color data expressing method is determined in accordance with the color characteristics of the CRT R, G, and B phosphor materials serving as coloring materials used in the television receiver.

As in the digital color copying machine described above, however, when the color image reading apparatus, the color image processing apparatus, and the color image output apparatus employ different color expressing methods suitable therefor, in order to cause the color image processing apparatus to process color data read by the color image reading apparatus and cause the color image output apparatus to output the processed color data, conversion operations must be repeated to obtain data suitable for each color expressing method of each apparatus due to differences in spectral sensitivity distributions and spectral characteristics of the apparatuses. This repetition results in inconvenience and loss of time.

SUMMARY OF THE INVENTION

It is an object of the present invention to provide a color expressing method which can solve the conventional problems described above.

It is another object of the present invention to provide a color image processing apparatus which can solve the conventional problems described above.

It is still another object of the present invention to provide a color image reading apparatus which can solve the conventional problems described above.

In order to achieve the above objects according to an aspect of the present invention, there is disclosed a color expressing method comprising expressing a color by a combination of data of reference stimuli represented by vertices of a triangle substantially circumscribing a spectral locus of a CIE color degree diagram.

In order to achieve the above objects according to another aspect of the present invention, there is disclosed a color image reading apparatus comprising photoelectric converting means for separating a beam from an object image into color components and photoelectrically converting the color components into electrical signals, and means for converting the electrical signals into color data expressed by a combination of data of reference stimuli represented by vertices of a triangle substantially circumscribing a spectral locus of a CIE color degree diagram.

In order to achieve the above objects according to still another aspect of the present invention, there is provided a color image processing apparatus comprising supply means for supplying color data expressed by a combination of data of reference stimuli represented by vertices of a triangle substantially circumscribing a spectral locus of a CIE color degree diagram, and converting means for converting the color data supplied from the supply means into color data expressed by another color expressing method.

It is still another object of the present invention to provide a color image reading apparatus capable of processing color image data independent of the color characteristics of devices of a plurality of apparatuses.

It is still another object of the present invention to provide a color image reading apparatus capable of obtaining color image data expressed by a color expressing method having a wide color expression range by using a color filter which can be easily manufactured.

The above and other objects, features, and advantages of the present invention will be apparent from the following detailed description of preferred embodiments in conjunction with the accompanying drawings.

BRIEF DESCRIPTION OF THE DRAWINGS

FIGS. 12A and 12B are other color degree diagrams of the embodiment shown in FIG. 1;

FIGS. 13A and 13B are still other color degree diagrams of the embodiment shown in FIG. 1;

FIG. 14 is a color degree diagram expressed by using a conventional XYZ colorimetric system;

DETAILED DESCRIPTION OF THE PREFERRED EMBODIMENTS

Figure 2:
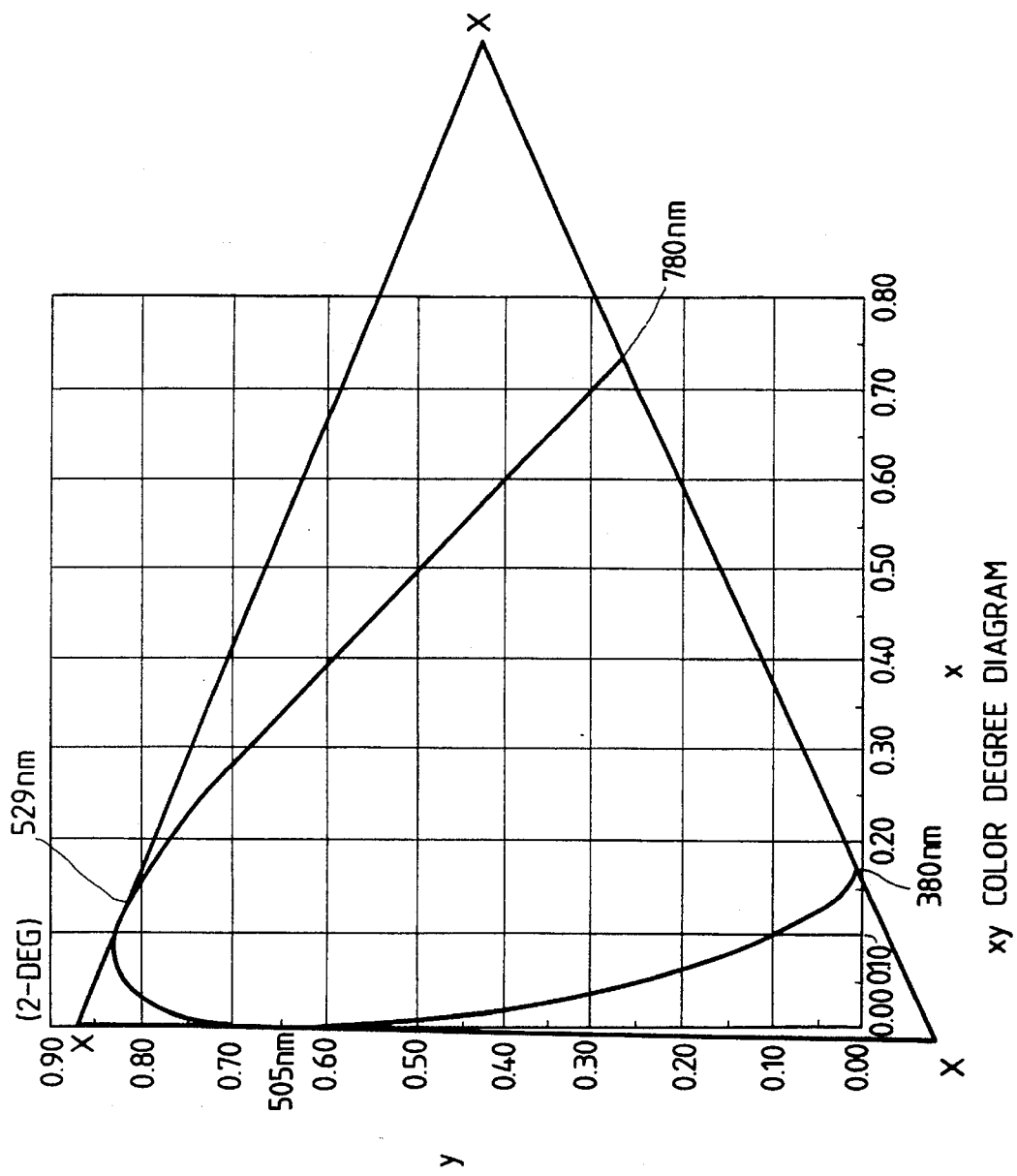
FIG. 2 is a color degree diagram showing reference stimuli according to the embodiment shown in FIG. 1.

In a color expressing method according to the first embodiment of the present invention, three x positions in FIG. 2 are defined as reference stimuli represented as follows in the xy coordinate system:

(1.07423,0.42295)

(0.01179,0.86921)

(−0.02358,−0.08679)

A triangle obtained by connecting these three points circumscribes a spectral locus of the xy color degree diagram substantially at 505 nm and 525 nm and overlaps a pure purple locus obtained by connecting 380- and 780-nm points.

Figure 3:
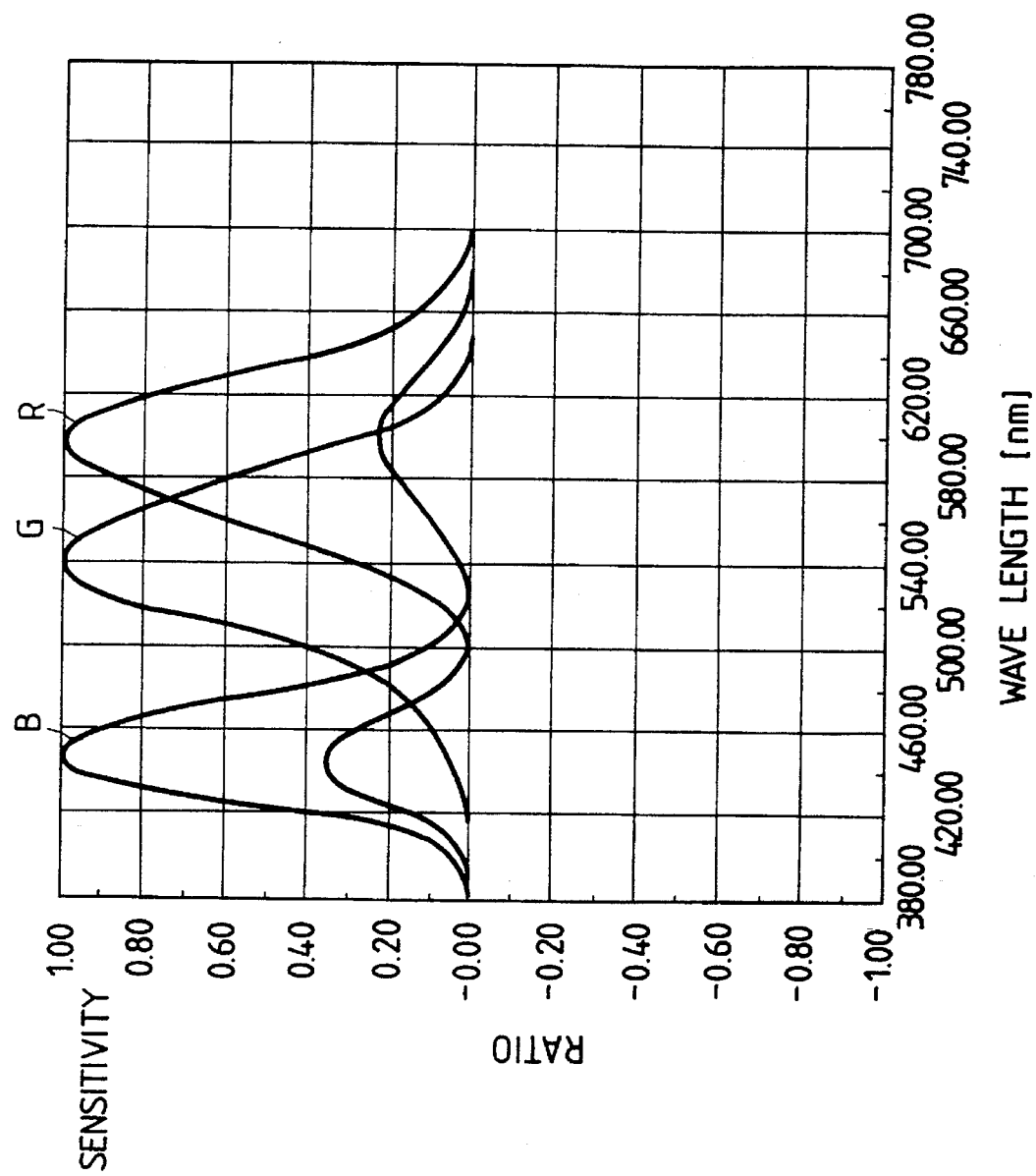
FIG. 3 is a graph showing the spectral sensitivities of a filter used in an image reading apparatus according to the embodiment shown in FIG. 1.

The spectral sensitivity characteristics for generating these reference stimuli are given as characteristics shown in FIG. 3 (normalized with maximum sensitivity values).

Referring to FIG. 3, a red spectral sensitivity has a small sensitivity peak in a blue region. A wavelength at a maximum peak value of this small peak almost coincides with a maximum sensitivity wavelength (about 445 nm) of the blue spectral sensitivity. The blue spectral sensitivity has a small sensitivity peak in a red region. A wavelength at a maximum peak value of this small peak almost coincides with a maximum sensitivity wavelength (about 600 nm) of the red spectral sensitivity.

In view of the above, the blue region in the red spectral sensitivity can be substituted with the blue spectral sensitivity. Similarly, the red region in the blue spectral sensitivity can be substituted with the red spectral sensitivity. R, G, and B signals output from a color sensor are processed to correct the spectral sensitivities. The blue region in the red spectral sensitivity and the red region in the blue spectral sensitivity are eliminated to obtain the graph shown in FIG. 1.

Figure 1:
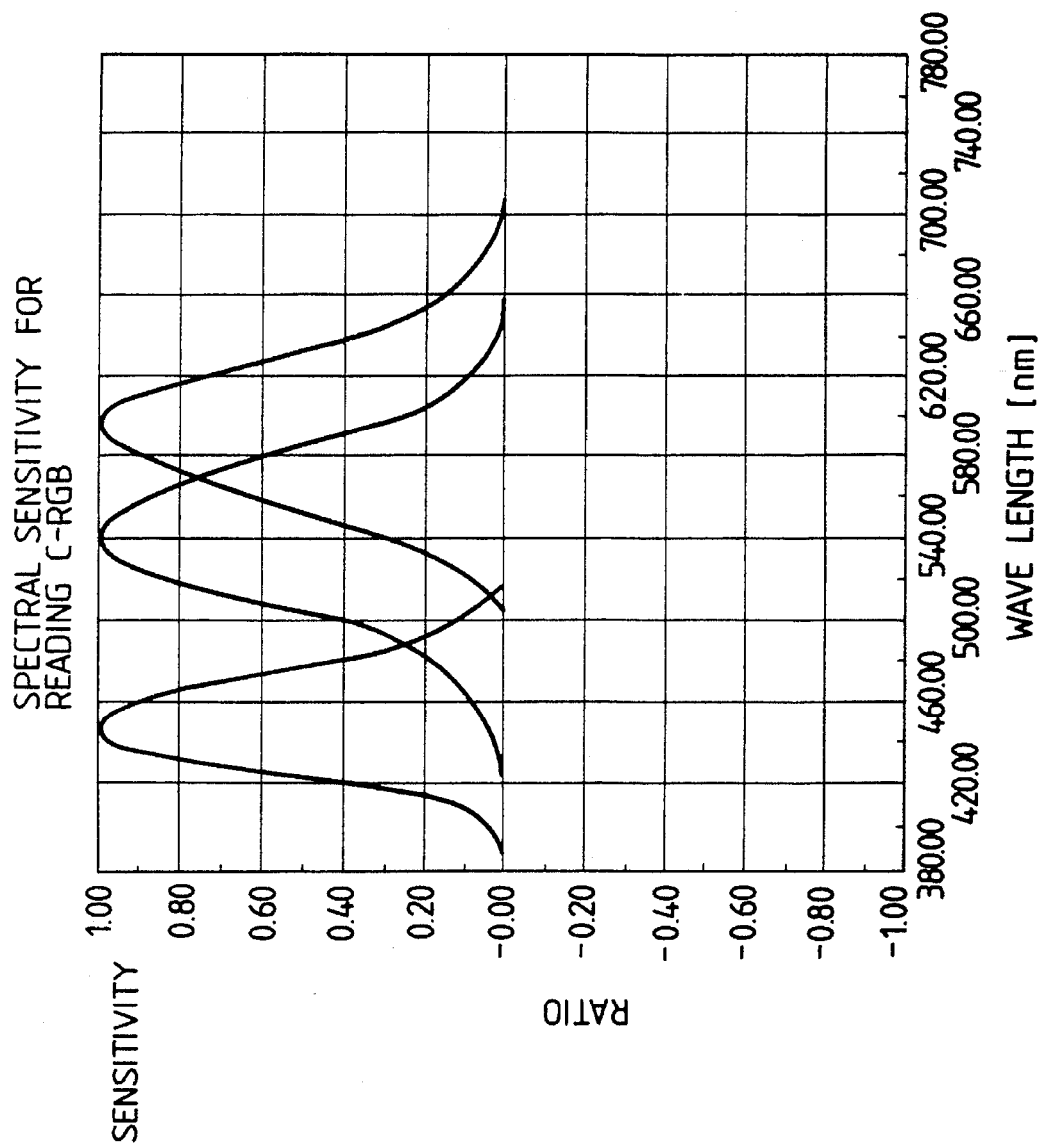
FIG. 1 is a graph showing the spectral sensitivities according to an embodiment of the present invention.
Figure 8:
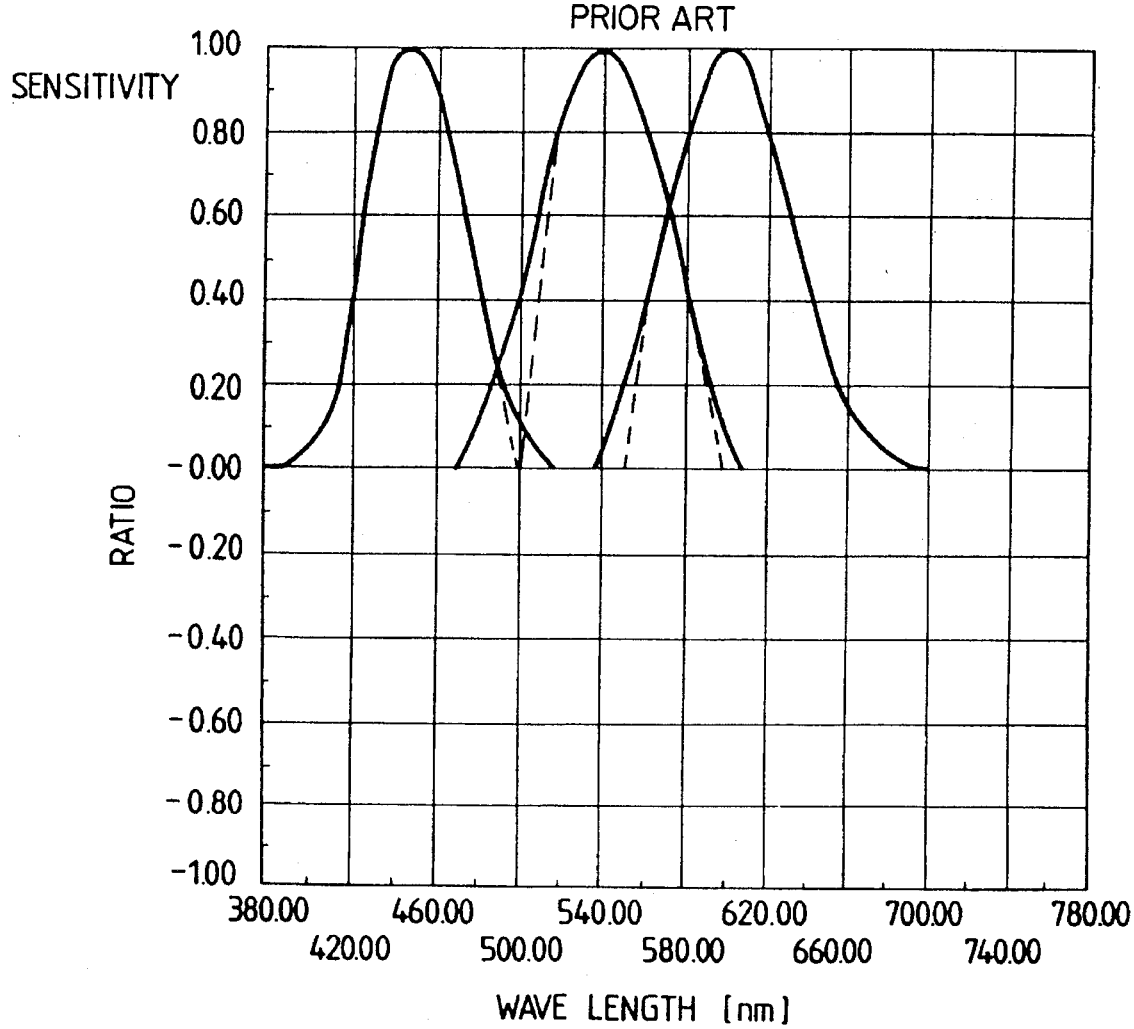
FIG. 8 is a graph showing the spectral sensitivities used in an image reading apparatus used in a conventional apparatus.
Figure 9:
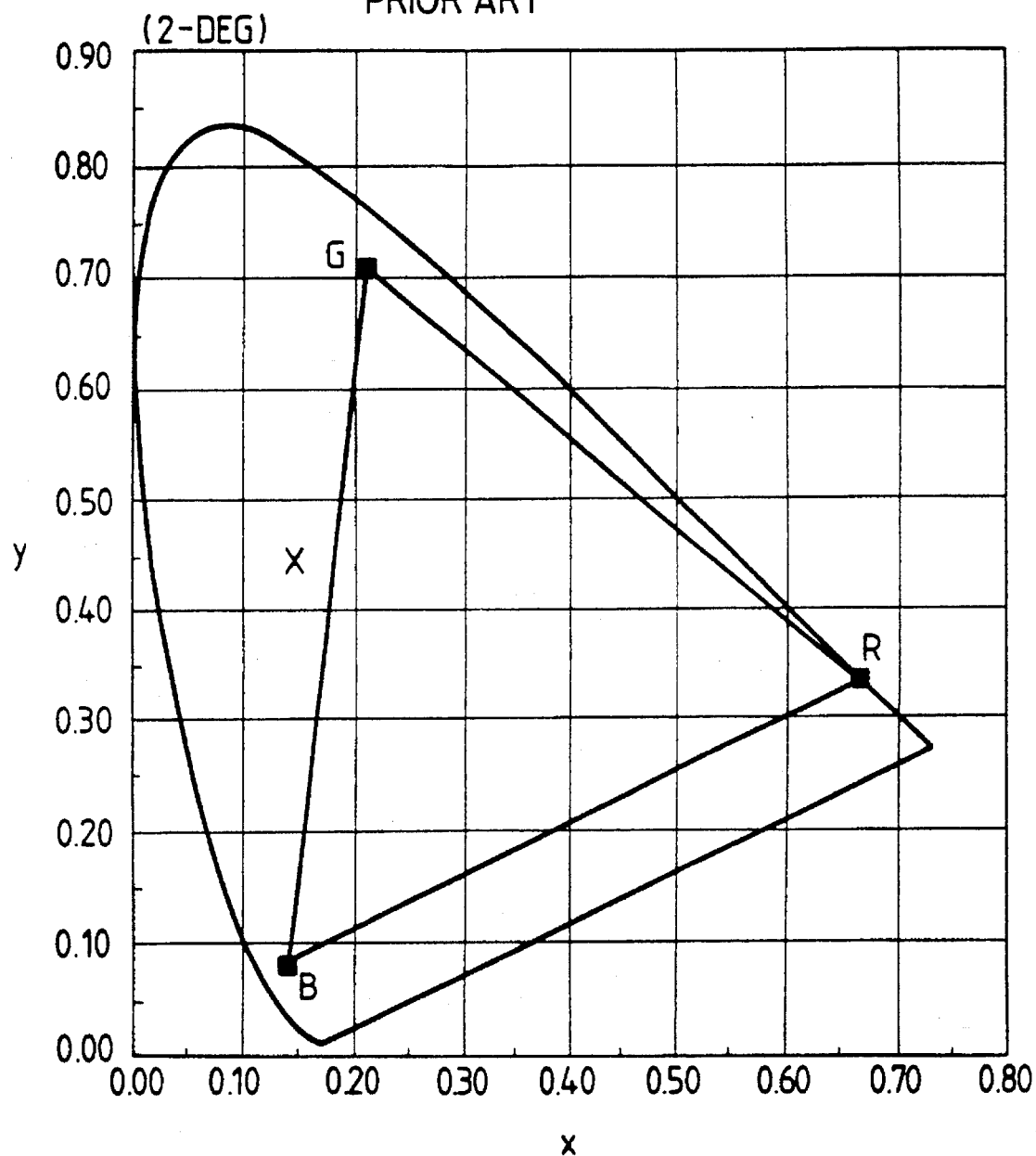
FIG. 9 is a color degree diagram for explaining the conventional example shown in FIG. 6.
Figure 10:
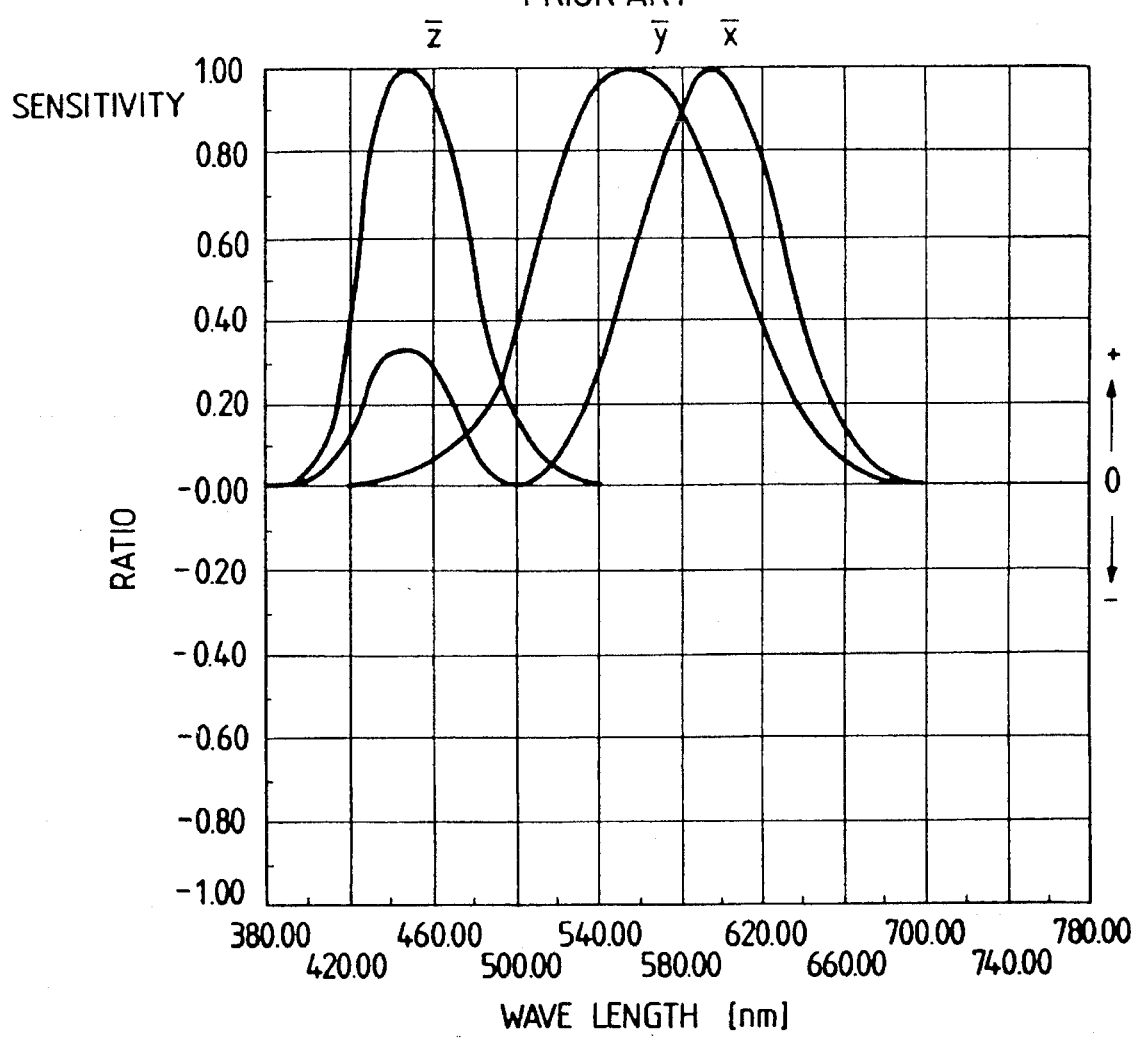
FIG. 10 is a graph showing the spectral sensitivities of another conventional example.

Since the spectral sensitivities in FIG. 1 have smaller full-widths at half maximum than those of the spectral sensitivities in FIG. 8, they can be relatively easily obtained by using dyes, pigments, and glass infrared cut filters.

Figure 4:
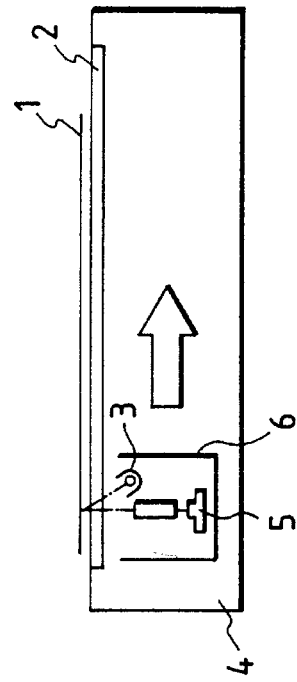
FIG. 4 is a sectional view showing an arrangement of an image reading apparatus of the embodiment shown in FIG. 1.

A color image reading apparatus having image pickup characteristics of the spectral sensitivities in FIG. 1 is shown in FIG. 4. The color image reading apparatus comprises an original glass table 2 on which an original 1 is to be placed, an original illumination unit 3, a short-focus lens array 4, a linear color solid-state image pickup element array 5 having the spectral characteristics shown in FIG. 1, and an optical unit 6. The solid-state image pickup element array 5 electrically scans the original 1 in a main scanning direction. That is, the optical unit 6 scans the original 1 in a direction indicated by an arrow. The original illumination unit 3 illuminates the original 1 placed on the original glass table 2. Light reflected by the original 1 is focused on the color solid-state image pickup element array 5 through the short-focus lens array 4. An original image focused on the color solid-state image pickup element array 5 is converted into R, G, and B electrical signals by the image pickup element array 5.

Figure 5:
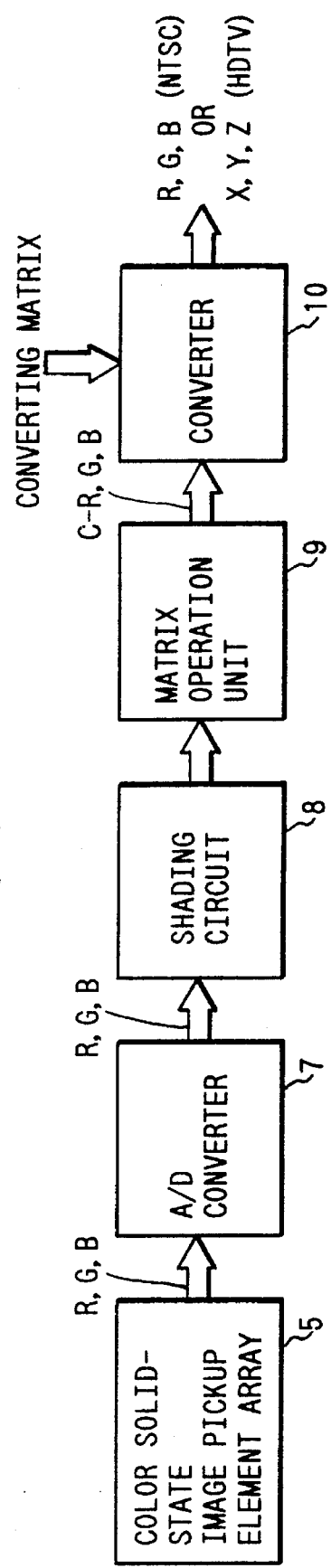
FIG. 5 is a block diagram of a circuit of the embodiment shown in FIG. 1.
Figure 6:
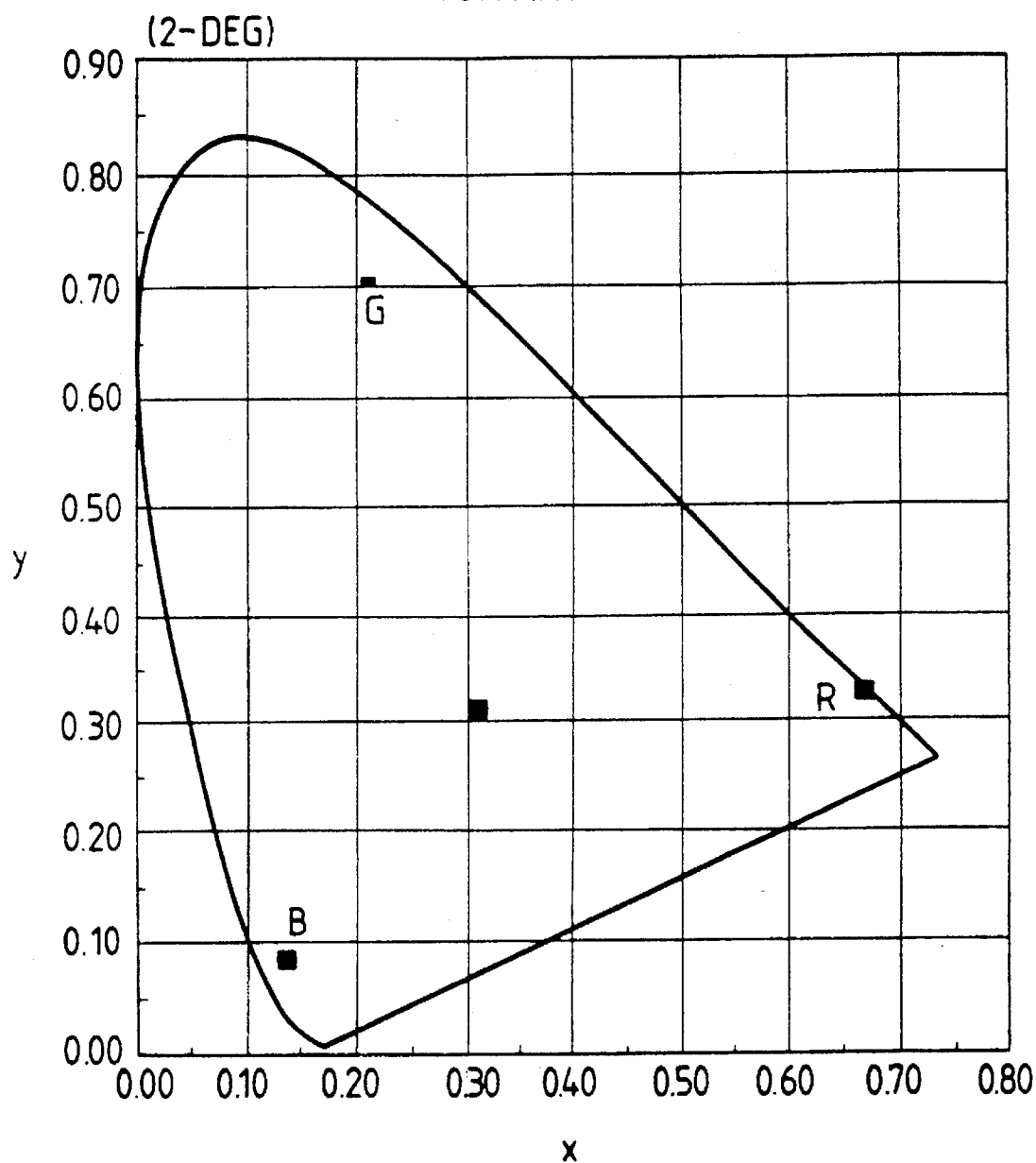
FIG. 6 is a color degree diagram for explaining a conventional example.
Figure 7:
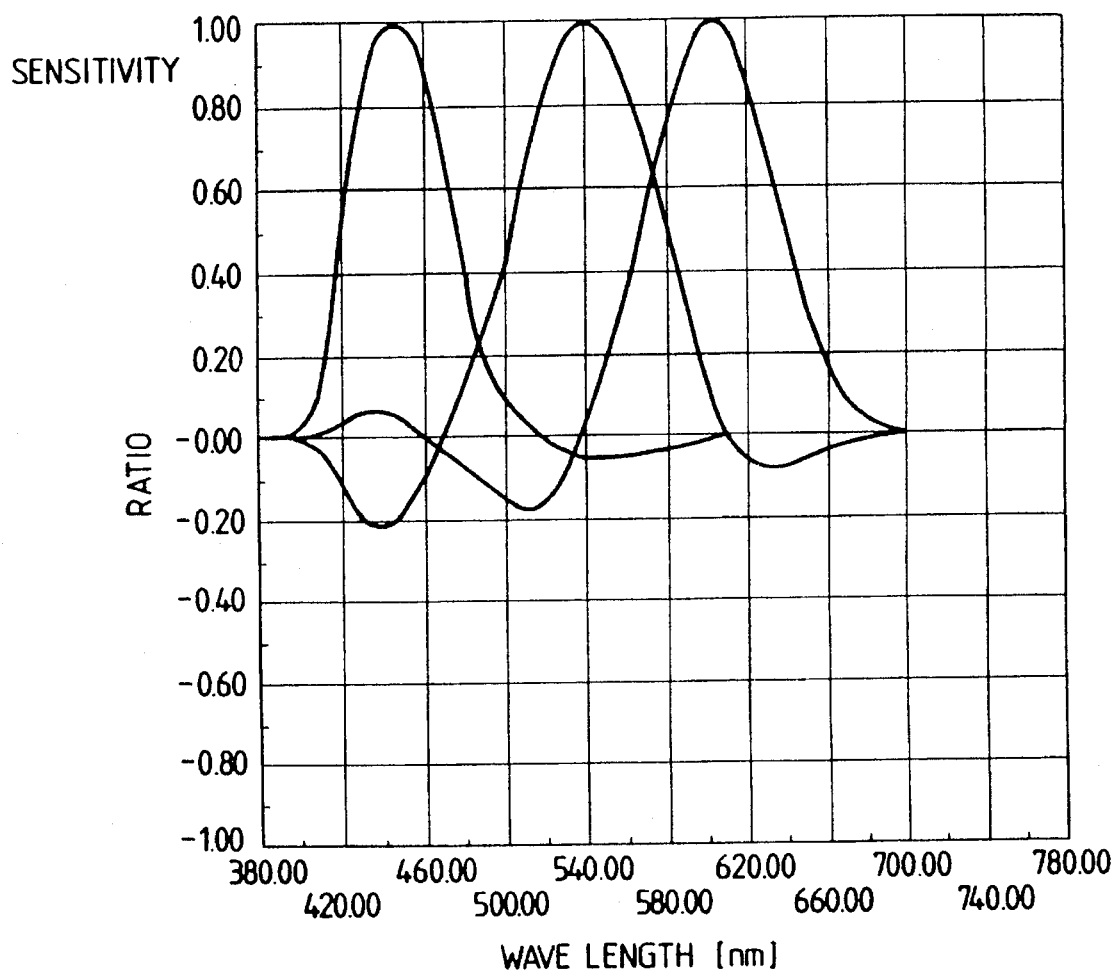
FIG. 7 is a graph showing the spectral sensitivities for explaining the conventional example.

FIG. 5 is a block diagram showing a circuit for processing the signals output from the color solid-state image pickup element array 5 shown in FIG. 4. The R, G, and B signals as analog signals are converted into digital signals by an A/D converter 7. A shading circuit 8 corrects variations in sensitivities of the color solid-state image pickup element array 5 and variations in illuminance of the original illumination unit 3. A 3×3 matrix operation unit 9 performs a matrix operation. The conversion matrix is represented as follows (in this case, since the R, G, and B signals are corrected by the shading circuit 8, they are normalized as R'=G'=B'=1 if these input signals are given as R=G=B=1):

$$\begin{bmatrix} R' \\ G' \\ B' \end{bmatrix} = \begin{bmatrix} 0.83456 & -0.01261 & 0.17805 \\ 0.00000 & 1.00000 & 0.00000 \\ 0.28673 & -0.04576 & 0.75903 \end{bmatrix} \begin{bmatrix} R \\ G \\ B \end{bmatrix} \quad (1)$$

By this operation, the R, G, and B signals can be converted as if the R, G, and B signals are read using the spectral sensitivities shown in FIG. 3. When coefficients of matrix (1) in the matrix operation unit 9 are changed as follows, reference stimuli can be converted as shown in FIG. 13B:

$$\begin{bmatrix} R' \\ G' \\ B' \end{bmatrix} = \begin{bmatrix} 0.88468 & 0.05105 & 0.06427 \\ 0 & 1 & 0 \\ 0.00050 & 0.03968 & 0.95982 \end{bmatrix} \begin{bmatrix} R \\ G \\ B \end{bmatrix} \quad (2)$$

Figure 15:
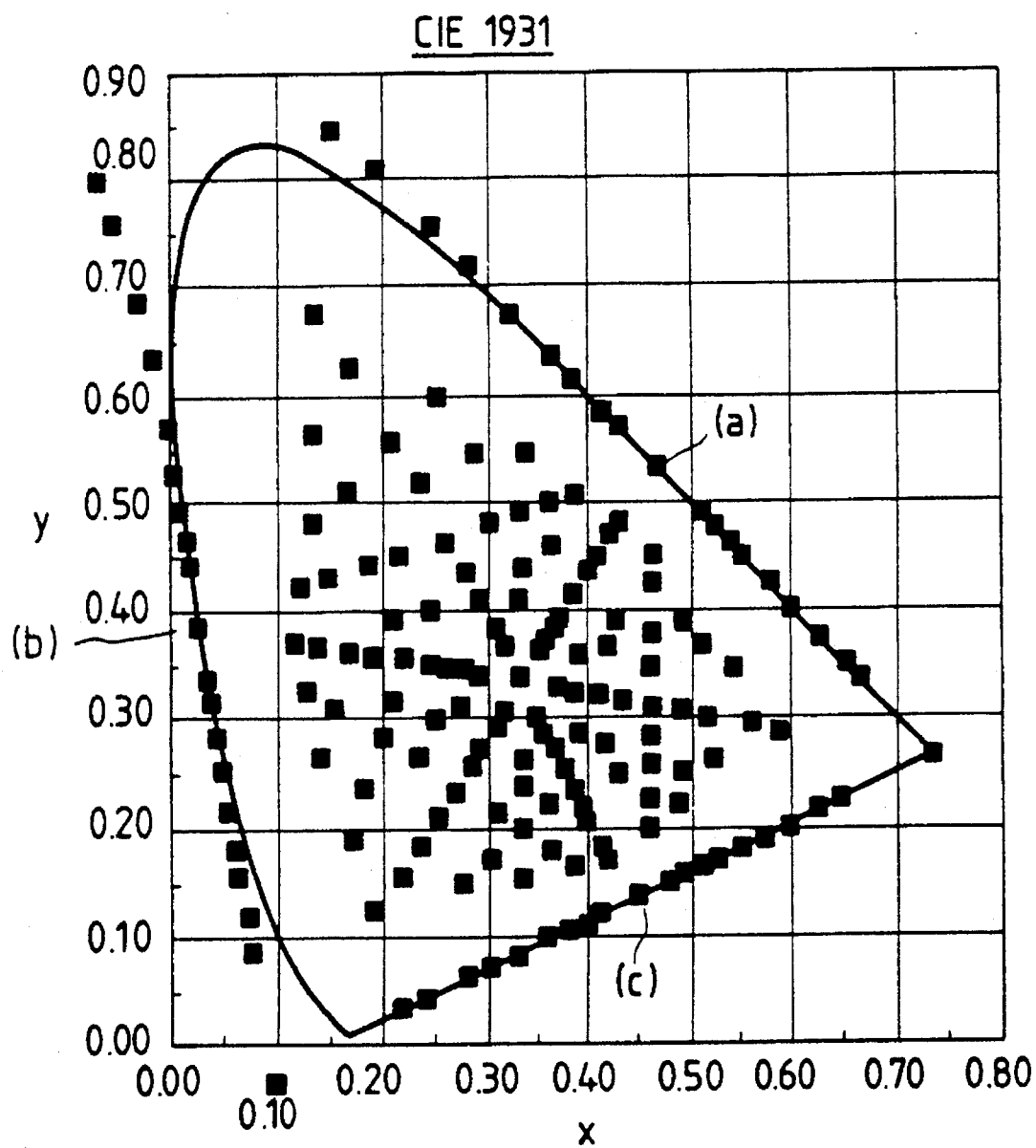
FIG. 15 is another color degree diagram expressed by using the conventional XYZ colorimetric system.

This color expressing method in FIG. 13B allows more effective signal utilization than the XYZ colorimetric system. This more effective signal utilization can be shown in FIG. 15. The number of effective data can be up to about 89% of all data to be quantized and is thus larger than that of the XYZ colorimetric system. Chromaticity points (a), (b), and (c) (FIG. 15) satisfying conditions R=G, B=0, G=B, R=0, R=G, and B=0 have relatively large numbers of data due to the nature of digital data. When these chromaticity points are plotted on the spectral locus or the pure purple locus, effective data utilization can be further assured. In FIG. 15, these chromaticity points are located at 490- and 573-nm points and on the pure purple locus. Basic stimuli in FIG. 15 are equi-energy spectra. If other basic stimuli (e.g., $D_{65}$ or a C light source) are used, the chromaticity points (a), (b), and (c) are slightly shifted, but can be plotted near positions as shown in FIG. 13B.

In this embodiment, the reference stimuli are set to be circumscribed at almost the 505- and 525-nm points in FIG. 2. However, the reference stimuli may be circumscribed in the ranges of 480 nm to 510 nm and 520 nm to 570 nm. In this case, spectral characteristics obtained by removing the blue and red components, respectively, from the red and blue spectral sensitivities are used and the removed components are added in the 3×3 matrix operation as in the above embodiment.

The basic stimuli of an illumination light source, an observation light source, or the like used in the reading apparatus shown in FIG. 4 may be equal-energy spectra or may generated by a light source such as $D_{65}$, a C light source, or $D_{50}$ standardized by the CIE.

A color reproduction region can be increased when filter spectral sensitivities have spectral sensitivity obtained in consideration of the spectral energy distribution of a light source (e.g., $D_{65}$ or a C light source). For this purpose, characteristics represented by a weighting function and obtained by multiplying the spectral energy distribution of the light source in units of wavelengths with the spectral sensitivities in FIG. 1 are used as the total spectral sensitivities of a system including an illumination light source of the reading apparatus. In this case, if the total spectral sensitivities are set to coincide with the weighting function, any light source other than $D_{65}$ and a C light source may also be used.

R, G and B signals read in accordance with the spectral sensitivities in FIG. 1 may be converted into NTSC or HDTV color signals in accordance with the matrix operation. In this case, a matrix is arranged to convert the above reference and basic stimuli (e.g., equi-energy spectra) into reference and basic stimuli of the NTSC or HDTV scheme. This conversion is performed in a converter 10 in FIG. 5.

Conversion into NTSC (conversion to HDTV will be omitted since matrix coefficients can be similarly obtained with only the reference and basic stimuli of the HDTV scheme being different from those of the NTSC scheme):

$$\begin{bmatrix} 1.6351 & -0.4713 & -0.0750 \\ -0.2503 & 1.4329 & -0.1962 \\ 0.0148 & -0.0848 & 0.9073 \end{bmatrix} \quad (3)$$

The matrix operation unit 9 in FIG. 5 may perform the operation of matrix (2) and the converter 10 may perform an operation of matrix (3). However, the stimulus value conversion matrix (3) may be multiplied with matrix (2) to use matrix (4) as coefficients in the matrix operation in FIG. 5:

$$\begin{bmatrix} R' \\ G' \\ B' \end{bmatrix} = \begin{bmatrix} 1.4465 & -0.3908 & 0.0331 \\ -0.2216 & 1.4124 & -0.2044 \\ 0.0136 & -0.0481 & 0.8718 \end{bmatrix} \begin{bmatrix} R \\ G \\ B \end{bmatrix} \quad (4)$$

When the gamma characteristics of the monitor are taken into consideration, each resultant value is multiplied with 0.45.

XYZ stimulus values of the CIE can be converted by the above stimulus value conversion matrix. If the XYZ stimulus values are obtained, processing using mathematical expressions can be performed in the converter 10 in FIG. 5 to obtain XYY and L*A*B* stimulus values.

Figure 11:
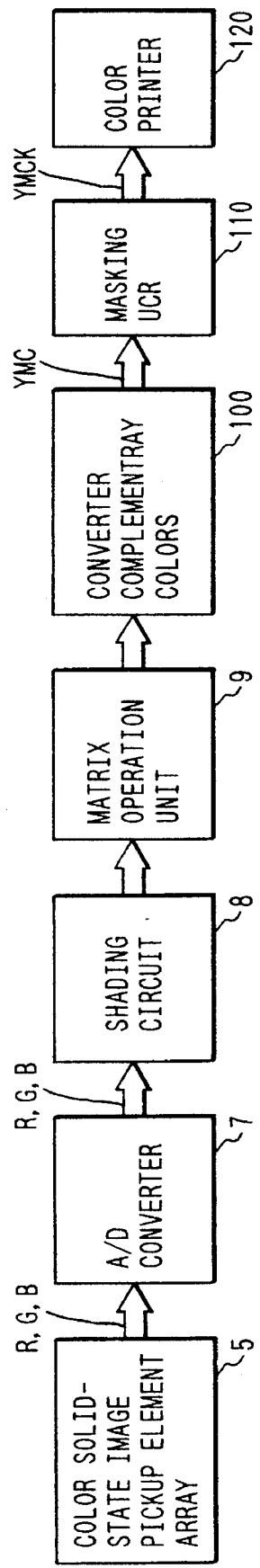
FIG. 11 is a block diagram of an image processing apparatus according to another embodiment of the present invention.

FIG. 11 shows an image processing apparatus according to another embodiment of the present invention. The same reference numerals as in FIG. 5 denote the same parts in FIG. 11, and a detailed description thereof is omitted.

The image processing apparatus shown in FIG. 11 comprises a complementary color converter 100 for converting R, G, and B color signals into Y, M, and C (yellow, magenta, and cyan) complementary color signals, and a masking UCR 110 for correcting color mixture components of the colorants used in a color printer 120 with respect to the Y, M, and C signals and for performing undercolor removal and inking. The color printer 120 may be an electrophotographic, ink-jet, or any other printer.

According to the embodiment shown in FIG. 11, since accurate color data are obtained, color reproducibility in the color printer can be improved.

The above embodiment exemplifies an image reading apparatus having a flat bed as shown in FIG. 4. However, a video camera, a still video camera, or the like may be used as an image input apparatus, as a matter of course.

In the above embodiment, a color is expressed by a combination of reference stimulus data representing the vertices of the triangle shown in FIG. 2. However, the present invention is not limited to this. For example, a color may be expressed by a combination of reference stimulus data representing the vertices of a triangle shown in each of FIGS. 12B and 13B. In addition, the color degree diagram is obtained by utilizing an equi-color function having a two-degree viewfield. However, an equi-color function having a ten-degree viewfield may be used. Alternatively, RGB equi-color functions proposed by Guild and Wright may be used, or a color degree diagram obtained from any other equi-color function may be used.

Figure 13A:
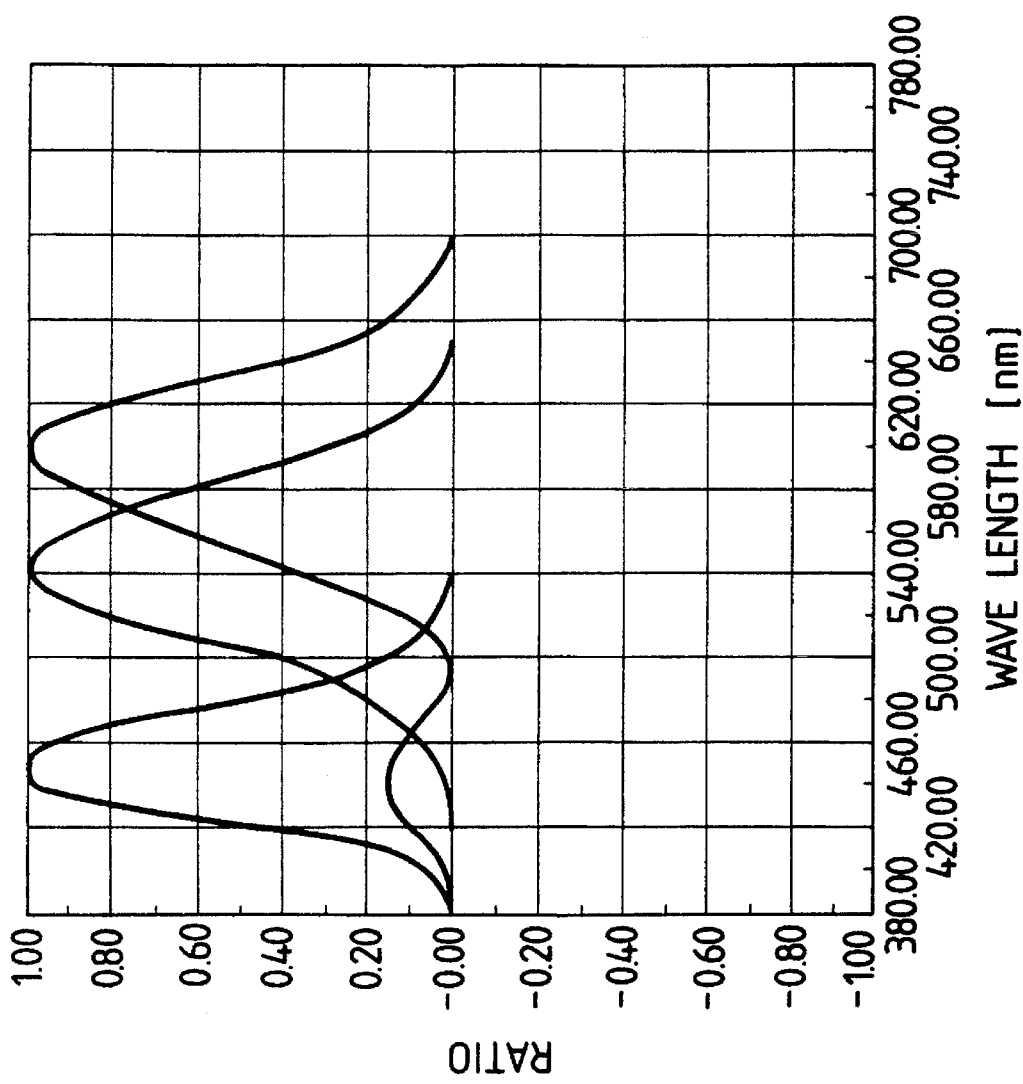

FIGS. 12A and 13A show the spectral sensitivity characteristics for obtaining reference stimuli in FIGS. 12B and 13B, respectively.

As described above, according to the above embodiments, a color expressing method having image pickup characteristics as practical spectral sensitivities having reference stimuli at the vertices of a triangle circumscribing a spectral locus of the color degree diagram to effectively utilize signal values is employed so as to improve color reproducibility and allow effective utilization of signals while preventing the signal values from being negative.

According to these embodiments, simple, accurate color expression can be performed.

Figure 16:
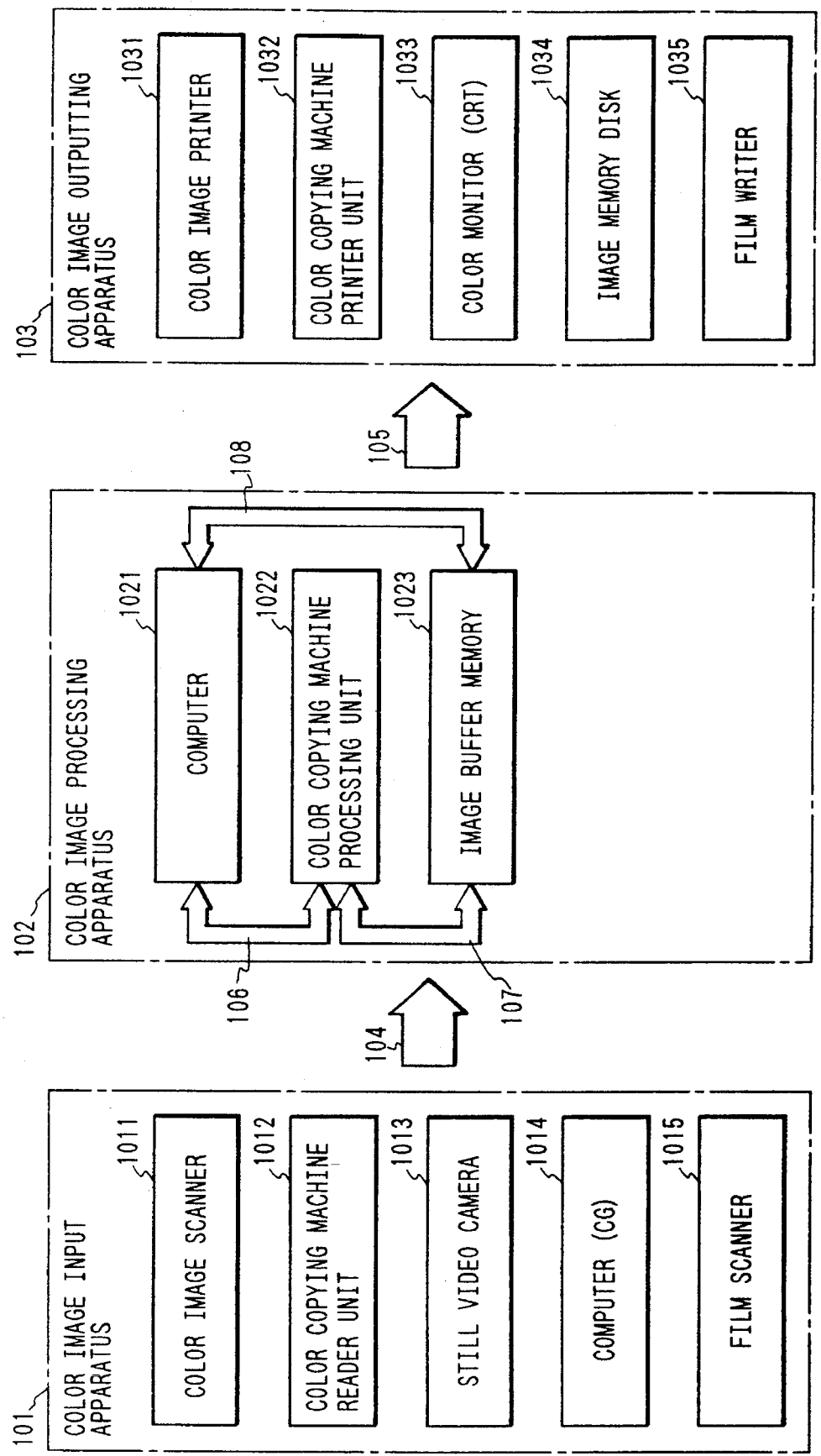
FIG. 16 is a block diagram showing an arrangement according to still another embodiment of the present invention.

FIG. 16 is a block diagram showing an arrangement according to still another embodiment of the present invention.

An image processing apparatus shown in FIG. 16 mainly comprises a color image input apparatus 101 for receiving or generating a color image, a color image processing apparatus 102 for performing various image processing operations (e.g., color conversion, image synthesis, and image analysis) of the input color image, and a color image output apparatus 103 for displaying the color image on a monitor or printing and recording the color image.

Each apparatus has various types of devices in accordance with the formats of input/output images and processing contents. For example, the color image input apparatus 101 comprises a color image scanner 1011 for reading color-separated signals of light reflected by printed matter placed on an original table as read signals, a color copying machine reader 1012, a still video camera 1013 for reading a natural scene such as scenery in a color still image, a computer 1014 for forming a color image such as a computer graphic (CG) image, and a film scanner 1015 for reading an image from a silver chloride film. Since these devices input and generate a color image and perform predetermined color processing, color data 104 is output to the color image processing apparatus 102 (to be described in detail below).

The color image processing apparatus 102 comprises a computer 1021 for performing color conversion, image synthesis and image analysis, a color copying machine processing unit 1022, and an image buffer memory 1023. The color data 104 sent from the color image input apparatus 101 is input to the color image processing apparatus 102, and the color image processing apparatus 102 performs predetermined image processing on the basis of the color data 104, thereby outputting image data.

The color image processing apparatus 102 performs data transfer operations as data transfer between the image processing devices corresponding to the processing contents in the color image processing apparatus 102. These data transfer operations are data transfer (corresponding data serves as transfer data 106) between the computer 1021 and the color copying machine processing unit 1022, data transfer (transfer data 107) between the color copying machine processing unit 1022 and the image buffer memory 1023, and data transfer (transfer data 108) between the computer 1021 and the image buffer memory 1023. The color image converted by the color image processing apparatus 102 is sent as color data 105 to the color image output apparatus 103. The image data 105 is output from the color image output apparatus 103 in various formats.

The color image output means 103 comprises a color image printer 1031 for printing and recording an image in accordance with an ink-jet, thermal transfer, silver chloride photographic, or electrophotographic scheme, a color copying machine printer unit 1032, a color monitor 1033 for operating RGB phosphors of a cathode-ray tube to display a color image, an image memory disk 1034 (e.g., an optical disk, a magnetic tape, or an optomagnetic disk) for holding color image data, and a film writer 1035 for exposing color light on a color silver chloride film to form a color image thereon.

The above apparatuses have output and input units (not shown), and formatted data is transferred between the apparatuses through cables (not shown) in accordance with a predetermined data format.

A data expressing method for standardizing the transfer data 104 to 108 in the apparatus of this embodiment will be described below.

As a color expressing method of this embodiment, a color expressing method using reference stimuli at predetermined positions represented by marks x in the xy color degree diagram shown in FIG. 13B is used. These reference stimuli are represented in the xy coordinate system as follows:

R: (0.7347,0.2653)

G: (−0.0860,1.0860)

B: (0.0957,−0.0314)

At this time, a triangle obtained by connecting these three points almost circumscribes a spectral locus of the xy color degree diagram, at a point corresponding to a wavelength of 505 nm, and a point corresponding to a wavelength of 525 nm. In addition, the triangle overlaps a pure purple locus obtained by connecting a 380-nm point (point A) and a 780-nm point (point B).

FIG. 3 shows the spectral sensitivity characteristics for generating the above reference stimuli. The characteristics are normalized with maximum sensitivity values.

As described above, according to this embodiment, a color expressing method of color input/output data in the color image input and outputting apparatuses and the color image processing apparatus is obtained as a color expressing method using signals which maximally suppresses chromaticity values outside the spectral locus, i.e., nonexisting colors in such a manner that the reference stimuli at the vertices of the triangle circumscribing the spectral locus of the color degree diagram are used to include the spectral locus of the color degree diagram in the color space. Therefore, the color data can be transferred between the apparatuses in the same color space, thus color space conversion processing circuits can be omitted.

The color data signals can be efficiently processed between the respective apparatuses, and color reproducibility can be improved.

The present invention is applicable to a system constituted by a plurality of equipments or an apparatus consisting of one equipment. The present invention is also applicable to an arrangement in which a program is supplied to a system or apparatus, as a matter of course.

As described above, according to this embodiment, a color expression which maximally eliminate nonexisting colors by including the spectral locus on the color degree diagram in the color space is employed. Therefore, color data can be transferred within the same color space, and color reproducibility can be improved.

What is claimed is:

1. A color processing apparatus comprising:

receiving means for receiving a color image signal;

image processing means for performing predetermined image processing of the received color image signal; and output means for outputting a processed color image signal, wherein said received color image signal and said output color image signal in a combination of data of reference stimuli represented by vertices of a triangle of which one side circumscribes a pure purple locus and of which remaining two side circumscribes two points of a spectral locus of a color degree diagram, the two points representing substantially middle colors between a color represented by one vertex of the triangle at which the remaining two sides intersect and each of two colors represented by remaining two verticles of the triangle, respectively.

2. An apparatus according to claim 1, wherein the reference stimuli are represented in an xy coordinate system as follows:

(0.734,0.2653)

(−0.0860,1.0860)

(0.0975,−0.0314).

3. An apparatus according to claim 1, wherein said image processing means in adapted for a color copying machine process.

4. An apparatus according to claim 1, further comprising supplying means for supplying the color image signal.

5. An apparatus according to claim 4, wherein said supplying means is a color image scanner.

6. An apparatus according to claim 1, wherein said color processing apparatus is a computer.

7. An apparatus according to claim 1, further comprising color image forming means for forming the color image based on the output color image signal.

8. An apparatus according to claim 7, wherein said color image forming means is a monitor.

9. An apparatus according to claim 7, wherein said color image forming means is an electrophotography system printer.

10. An apparatus according to claim 7, wherein said color image forming means is inkjet system printer.

11. A color processing apparatus comprising:

data formatting means for formatting a color image signal which is a combination of data of reference stimuli represented by vertices of a triangle of which one side circumscribes a pure purple locus and of which remaining two sides circumscribes two points of a spectral locus of a color degree diagram, the two points of a spectral locus of a color degree diagram, the two points representing substantially middle colors between a color represented by one vertex of the triangle at which the remaining two sides intersect and each of two colors represented by remaining two vertices of the triangle, respectively; and transfer means for transferring the formatted color image signal.

12. An apparatus according to claim 11, wherein said transfer means transfers the color image signal by using a cable which connects each apparatus.

13. A color processing method comprising the steps of:

receiving a color image signal;

performing predetermined image processing of the received color image signal; and outputting a processed color image signal, wherein said received color image signal and said output color image signal is a combination of data of reference stimuli represented by vertices of a triangle of which one side circumscribes a pure purple locus and of which remaining two sides circumscribes two points of a spectral locus of a color degree diagram, the two points representing substantially middle colors between a color represented by one vertex of a triangle at which the remaining two sides intersect and each of two colors represented by remaining two vertices of the triangle, respectively.

14. A color processing method comprising the steps of:

formatting a color image signal which is a combination of data of reference stimuli represented by vertices of a triangle of which one side circumscribes a pure purple locus and of which remaining two sides circumscribes two points of a spectral locus of a color degree diagram, the two points representing substantially middle colors between a color represented by one vertex for the triangle at which the remaining two sides intersect and each of two colors represented by remaining two vertices of the triangle, respectively; and transferring the formatted color image signal.

* * * * *

UNITED STATES PATENT AND TRADEMARK OFFICE
CERTIFICATE OF CORRECTION

PATENT NO. : 5,504,592

DATED : April 2, 1996

INVENTOR(S) : Akihiro Usami et al.

It is certified that error appears in the above-identified patent and that said Letters Patent is hereby corrected as shown below:

ABSTRACT

```
    Line 4, "verticles" should read --virtices--.
    Line 5, "circumscribe" should read --circumscribes--.
    Line 6, "circumscribers" should read --circumscribes--.
```

COLUMN 1

```
    Line 9,  "1 ." should read --1.--.
    Line 18, "alscheme" should read --al--.
    Line 25, "del'Eclairage)" should read --de l'Eclairage)--

Line 49, "marks X" should read --marks x--.
    Line 63, "Y" should read --y--.
```

COLUMN 2

```
    Line 47, "tions-must" should read --tions must--.
```

COLUMN 5

```
    Line 61, "generated" should read --be generated--.
```

COLUMN 6

```
    Line 40, "XYY" should read --xyz--.
```

UNITED STATES PATENT AND TRADEMARK OFFICE
CERTIFICATE OF CORRECTION

PATENT NO. : 5,504,592

DATED : April 2, 1996

INVENTOR(S) : Akihiro Usami et al.

Page 2 of 2

It is certified that error appears in the above-identified patent and that said Letters Patent is hereby corrected as shown below:

<u>COLUMN 8</u>

Line 63, "eliminate" should read --eliminates--.

<u>COLUMN 9</u>

Line 18, "verticles" should read --vertices--.

<u>COLUMN 10</u>

Line 42, "for" should read --of--.

Signed and Sealed this

Tenth Day of September, 1996

*Attest:*

BRUCE LEHMAN

*Attesting Officer*   *Commissioner of Patents and Trademarks*